United States Patent
Takemoto (10) Patent No.: US 10,384,491 B2
(45) Date of Patent: Aug. 20, 2019

(54) PNEUMATIC TIRE (71) Applicant: Sumitomo Rubber Industries, Ltd., Kobe-shi, Hyogo (JP)

(72) Inventor: Yoshiaki Takemoto, Kobe (JP)

(73) Assignee: SUMITOMO RUBBER INDUSIRIES, LTD., Kobe-shi, Hyogo (JP)

( * ) Notice: Subject to any disclaimer, the term of this patent is extended or adjusted under 35 U.S.C. 154(b) by 290 days.

(21) Appl. No.: 15/359,753

(22) Filed: Nov. 23, 2016

(65) Prior Publication Data
US 2017/0166014 A1 Jun. 15, 2017

(30) Foreign Application Priority Data
Dec. 10, 2015 (JP) .................. 2015-241444

(51) Int. Cl.
*B60C 11/03* (2006.01)
*B60C 11/12* (2006.01)

(52) U.S. Cl.
CPC ........ *B60C 11/0304* (2013.01); *B60C 11/032* (2013.01); *B60C 11/0302* (2013.01); *B60C 11/0306* (2013.01); *B60C 11/1236* (2013.01); *B60C 11/1272* (2013.01); *B60C 2011/0341* (2013.01)

(58) Field of Classification Search
CPC ......... B60C 11/01; B60C 11/04; B60C 11/11; B60C 11/0302; B60C 11/0304; B60C 11/0306; B60C 2011/0341; B60C 2011/0386; B60C 11/0083; B60C 2011/0033; B60C 2200/06
USPC ................. 152/209.8, 209.15, 901
See application file for complete search history.

(56) References Cited

U.S. PATENT DOCUMENTS

| 4,905,748 A * | 3/1990 | Kukimoto ................. B60C 3/06 152/209.14 |
| 2014/0090759 A1* | 4/2014 | Tanaka ................ B60C 11/0306 152/209.8 |
| 2017/0297377 A1* | 10/2017 | Honda ................ B60C 11/0304 |

FOREIGN PATENT DOCUMENTS

| EP | 1 712 337 A1 | 10/2006 |
| EP | 2 716 477 A1 | 4/2014 |
| GB | 2 178 380 A | 2/1987 |
| JP | 5-139119 A | 6/1993 |

(Continued)

OTHER PUBLICATIONS

JP 9-300906, English language machine translation [epo.org]. (Year: 1997).*

(Continued)

*Primary Examiner* — Eric Hug
(74) *Attorney, Agent, or Firm* — Birch, Stewart, Kolasch & Birch, LLP (57) ABSTRACT

A pneumatic tire whose position when mounted on a vehicle is specified has a tread portion 2 having an outside tread edge Teo, an inside tread edge Tei, an outside crown land region 6, and an inside crown land region 7. In a meridian cross-section of the tire including the rotational axis of the tire in its regular state mounted on a regular rim, inflated to a regular pressure and loaded with no tire load, the outside crown land region 6 and the inside crown land region 7 each have a tread convexed outwardly in the tire radial direction, and the radius of curvature R1 of the tread of the outside crown land region 6 is greater than the radius of curvature R2 of the tread of the inside crown land region 7.

14 Claims, 6 Drawing Sheets

(56) References Cited

FOREIGN PATENT DOCUMENTS

| | | | | |
|---|---|---|---|---|
| JP | 9-300906 | * | 11/1997 | ......... B60C 11/0083 |
| JP | 2015-147545 A | | 8/2015 | |

OTHER PUBLICATIONS

Extended European Search Report dated Apr. 13, 2017, in European Patent Application No. 16201809.7.

* cited by examiner

PNEUMATIC TIRE

TECHNICAL FIELD

The present invention relates to a pneumatic tire capable of satisfying both of wet performance and steering stability.

BACKGROUND ART

The following Patent Literature 1 discloses a pneumatic tire provided on each side of the tire equator with a crown land region whose tread has an arc-shaped profile convexed outwardly in the tire radial direction. The crown land regions are expected to exert such effect that, when traveling in wet conditions, the crown land regions smoothly guide the water film existing on the road surface toward main grooves and contact with the ground thereby to reduce the occurrence of hydroplaning phenomenon.

In general, the ground contact pressure of a land region which is located on one side of the tire equator which side is toward the outside of a vehicle when the tire is mounted on the vehicle varies widely, and the land region is subjected to higher ground contact pressure during cornering.

In the pneumatic tire disclosed in the Patent Literature 1, the treads of the crown land regions located on both sides of the tire equator have a same profile, therefore, there is a tendency such that the crown land region located toward the outside of the vehicle when mounted on the vehicle is degraded in the ground contact, and deformed relatively largely during cornering. As a result, the steering stability is deteriorated.

Patent Literature 1: Japanese Patent Application Publication No. 2015-147545

SUMMARY OF THE INVENTION

The present invention was made in view of the above, and a primary object thereof is to provide a pneumatic tire which can satisfy both the wet performance and the steering stability by improving profiles of the treads of land regions.

According to the present invention, a pneumatic tire whose position when mounted on a vehicle is specified, comprises:

a tread portion having an outside tread edge located toward the outside of the vehicle when mounted on the vehicle, an inside tread edge located toward the inside of the vehicle when mounted on the vehicle, an outside crown land region located between the tire equator and the outside tread edge, and an inside crown land region located between the tire equator and the inside tread edge, wherein in a meridian cross-section of the tire including the rotational axis of the tire in a regular state of the tire mounted on a regular rim, inflated to a regular pressure and loaded with no tire load, each of the outside crown land region and the inside crown land region has a tread convexed outwardly in the tire radial direction, and a radius of curvature of the tread of the outside crown land region is greater than a radius of curvature of the tread of the inside crown land region.

In the pneumatic tire according to the present invention, it is desirable that, in the meridian cross-section, a maximum protruding amount of the tread of the outside crown land region from a first virtual straight line extending between both axial edges of the outside crown land region is equal to a maximum protruding amount of the tread of the inside crown land region from a second virtual straight line extending between both axial edges of the inside crown land region.

In the pneumatic tire according to the present invention, it is desirable that each of the outside crown land region and the inside crown land region has a plurality of sipes with a width smaller than 2 mm and has no grooves with a width larger than 2 mm.

In the pneumatic tire according to the present invention, it is desirable that the sipes include a plurality of outside central sipes located in the outside crown land region, and a plurality of inside central sipes located in the inside crown land region, and the total length of the outside central sipes is greater than the total length of the inside central sipes.

In the pneumatic tire according to the present invention, it is desirable that each of the inside central sipes extends across the entire width of the inside crown land region, the outside central sipes include a plurality of first sipes extending across the entire width of the outside crown land region, a second sipe whose one end is connected to an edge on the tire equator side, of the outside crown land region, and the other end is terminated within the outside crown land region, a third sipe whose one end is connected to an edge on the outside tread edge side, of the outside crown land region, and the other end is terminated within the outside crown land region, the outside crown land region includes a first portion partitioned by the first sipes and provided with the second sipe, and a second portion partitioned by the first sipes and provided with the third sipe, and the first portion and the second portion are provided alternately in the tire circumferential direction.

In the pneumatic tire according to the present invention, each of the outside crown land region and the inside crown land region has the tread convexed outwardly in the tire radial direction, in the meridian cross-section of the tire including the rotational axis of the tire in the regular state of the tire mounted on the regular rim, inflated to the regular pressure and loaded with no tire load. Therefore, during traveling in a wet condition, the outside crown land region and inside crown land region smoothly guide the water film existing on the road surface toward main grooves, and the land regions contact with the ground. Thus, it is possible to improve the wet performance. Further, the radius of curvature of the tread of the outside crown land region is greater than the radius of curvature of the tread of the inside crown land region. Thereby, the outside crown land region is improved in the ground contact, and its large deformation during cornering is suppressed, therefore, good steering stability can be obtained.

DESCRIPTION OF THE PREFERRED EMBODIMENT

An embodiment of the present invention will now be described in detail in conjunction with accompanying drawings.

Figure 1:
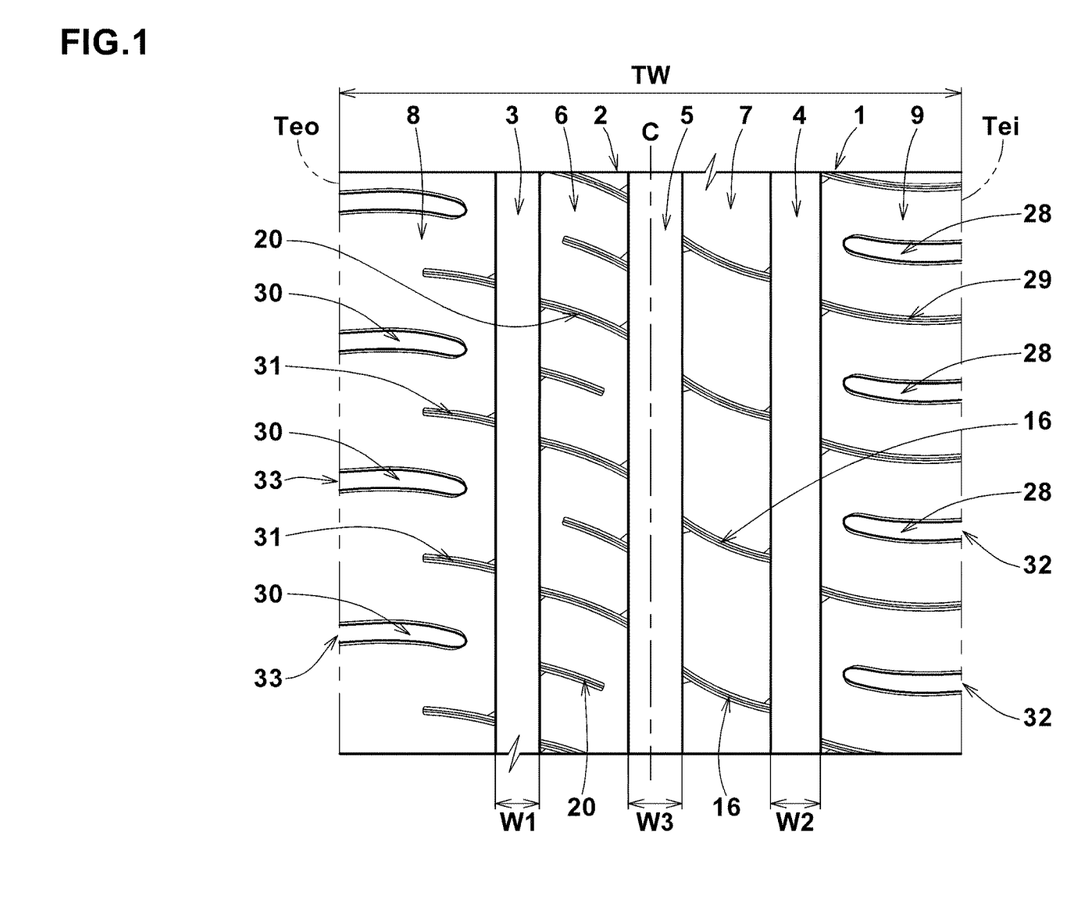
FIG. 1 is a development view illustrating a tread portion of a pneumatic tire as an embodiment of the present invention.

FIG. 1 is a development view of the tread portion 2 of a pneumatic tire as an embodiment of the present invention. The present invention is suitably applied to a pneumatic tire for passenger cars, and the pneumatic tire in the present embodiment is a passenger car tire.

In the present embodiment, the tread portion 2 has a tread pattern for which a mounting position on a vehicle is specified. The mounting position is indicated in a sidewall portion of the tire 1 by characters or marks (not shown), for example.

As shown in FIG. 1, the tread portion 2 has an outside tread edge Teo located toward the outside of a vehicle when mounted on the vehicle, and an inside tread edge Tei located toward the inside of the vehicle when mounted on the vehicle.

The outside tread edge Teo and the inside tread edge Tei are defined as the most outward grounding positions in the tire axial direction when the tire 1 in the regular state contacts with a flat surface with zero camber angle by being loaded with a regular tire load.

The "regular state" is a state where the tire 1 is mounted on a regular rim (not shown), inflated to a regular pressure, and loaded with no tire load.

Hereafter, dimensions, positions and the like of various parts of the tire 1 refer to those in the regular state unless otherwise noted.

The "regular rim" is a wheel rim specified for the concerned tire by a standard included in a standardization system on which the tire is based, for example, the "normal wheel rim" in JATMA, "Design Rim" in TRA, and "Measuring Rim" in ETRTO.

The "regular pressure" is air pressure specified for the concerned tire by a standard included in a standardization system on which the tire is based, for example, the "maximum air pressure" in JATMA, maximum value listed in the "TIRE LOAD LIMITS AT VARIOUS COLD INFLATION PRESSURES" table in TRA, and "INFLATION PRESSURE" in ETRTO.

The "standard load" is a tire load specified for the concerned tire by a standard included in a standardization system on which the tire is based, for example, the "maximum load capacity" in JATMA, maximum value listed in "TIRE LOAD LIMITS AT VARIOUS COLD INFLATION PRESSURES" table in TRA, and "LOAD CAPACITY" in ETRTO.

The tread portion 2 is provided with an outside shoulder main groove 3 which extends continuously in the tire circumferential direction on the most outside-tread-edge-Teo side, and an inside shoulder main groove 4 which extends continuously in the tire circumferential direction on the most inside-tread-edge-Tei side.

Between the outside shoulder main groove 3 and the inside shoulder main groove 4, a center main groove 5 which, for example, extends continuously in the tire circumferential direction is provided.

In the present embodiment, each of the outside shoulder main groove 3 and the inside shoulder main groove 4 is a straight groove substantially parallel with the tire circumferential direction.

In the present invention, however, the outside shoulder main groove 3 and the inside shoulder main groove 4 may be wavy or zigzag grooves.

The center main groove 5 is, for example, a straight groove substantially parallel with the tire circumferential direction.

In the present embodiment, the center main groove 5 is a single groove disposed on the tire equator C.

Preferably, the widthwise center line of the center main groove 5 in the present embodiment is deviated from the tire equator c toward the inside tread edge Tei. However, the center main groove 5 is not limited to such arrangement, and the center main grooves 5 may be provided on each side of the tire equator C.

It is preferable that a width w1 of the outside shoulder main groove 3, a width w2 of the inside shoulder main groove 4, and a width w3 of the center main groove 5 are within a range of from 6.5% to 9.5% of the tread width TW. The tread width TW is a distance in the tire axial direction between the outside tread edge Teo and the inside tread edge Tei of the tire 1 in the regular state.

It is preferable that the width w1 of the outside shoulder main groove 3 is smaller than the width w2 of the inside shoulder main groove 4.

The outside main groove 3 configured as such helps improvement of steering stability.

It is preferable that the width w3 of the center main groove 5 is larger than the width w1 of the outside shoulder main groove 3 and larger than the width w2 of the inside shoulder main groove 4. The center main groove configured as such helps improvement of wet performance.

By the main grooves, the tread portion 2 is provided with an outside crown land region 6 located between the tire equator C and the outside tread edge Teo and an inside crown land region 7 located between the tire equator c and the inside tread edge Tei.

Figure 2:
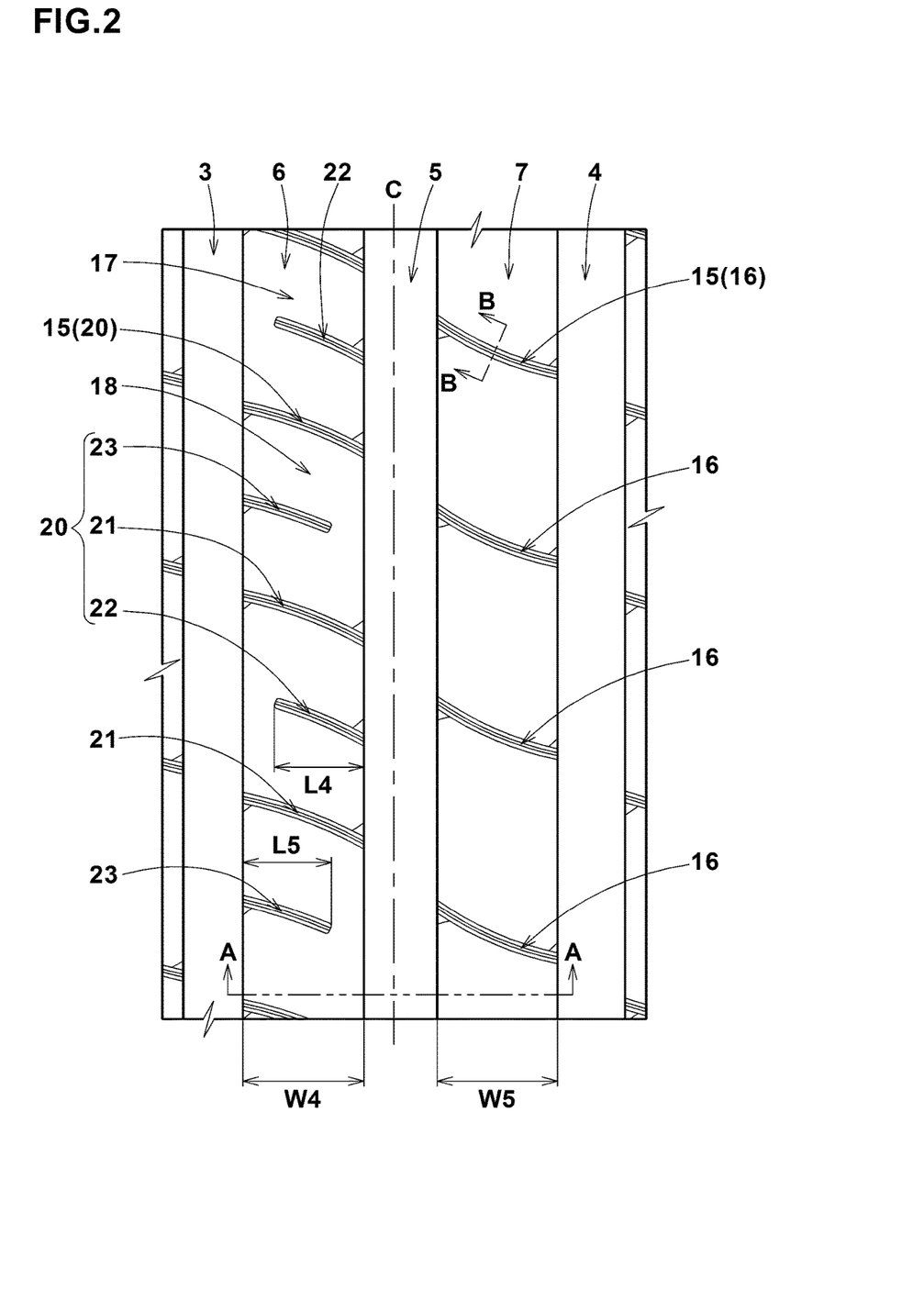
FIG. 2 is a magnified view illustrating an outside crown land region and an inside crown land region shown in FIG. 1.

In the present embodiment, as shown in FIG. 2 the outside crown land region 6 is defined between the outside shoulder main groove 3 and the center main groove 5, and the inside crown land region 7 is defined between the inside shoulder main groove 4 and the center main groove 5.

It is preferable that the width W4 of the tread of the outside crown land region 6 in the tire axial direction and the width w5 of the tread of the inside crown land region 7 in the tire axial direction are, for example, set in a range of from 0.10 to 0.20 times the tread width TW between the tread edges Teo and Tei of the tire 1.

The outside crown land region 6 and the inside crown land region 7 configured as such can improve the steering stability and the wet performance in a good balance.

Figure 3:
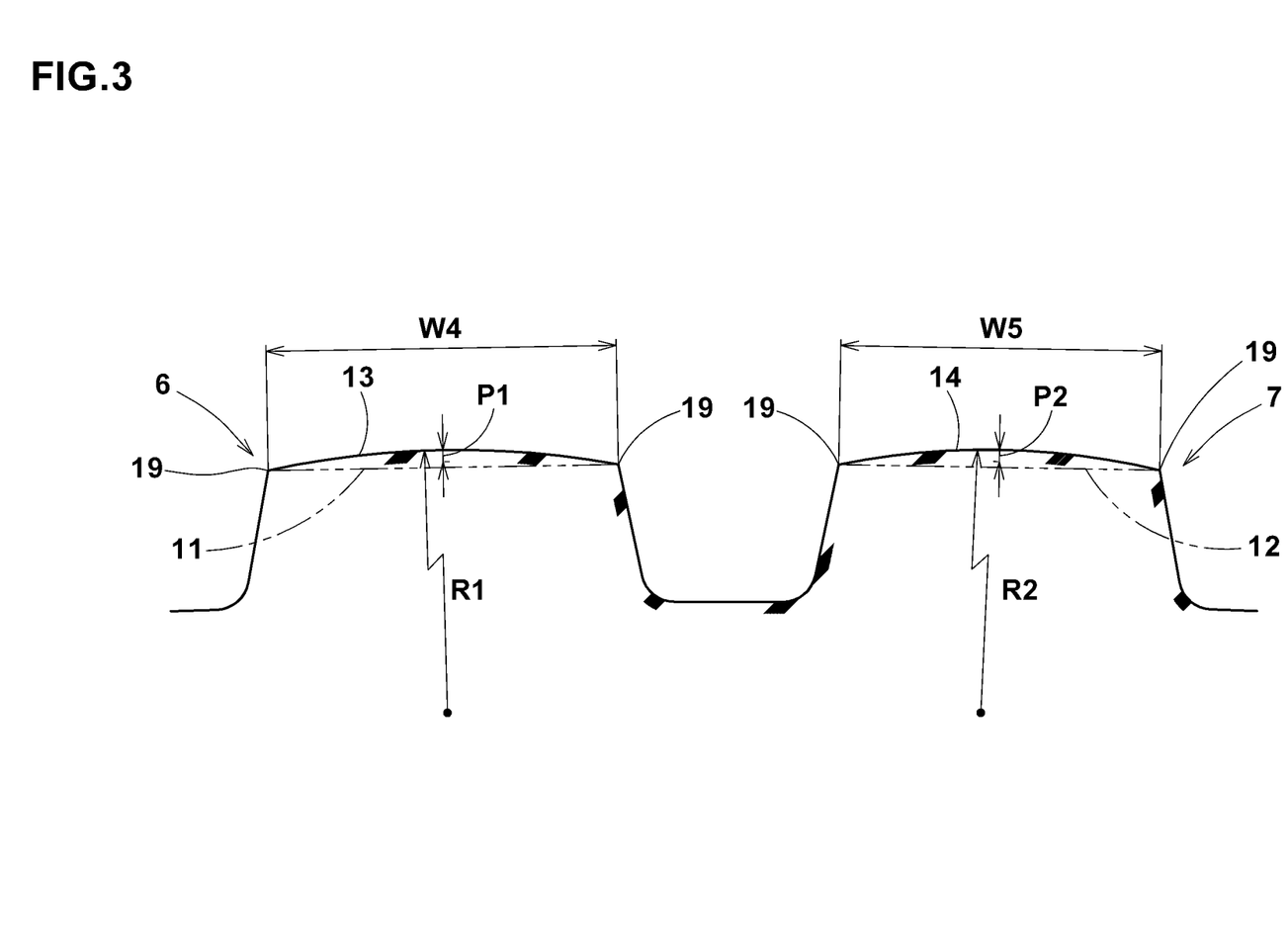
FIG. 3 is a cross-sectional view of the outside crown land region and the inside land region taken along line A-A in FIG. 2.

FIG. 3 shows a cross-section of the outside crown land region 6 and the inside crown land region 7, taken along line A-A in FIG. 2. This cross-section corresponds to a meridian cross-section of the tire 1 in the regular state including the rotational axis. Note that the features of the outside crown land region 6 and the inside crown land region 7 are emphasized in FIG. 3 for the purpose of easy understanding of the present invention.

As shown in FIG. 3, the tread of each of the outside crown land region 6 and the inside crown land region 7 has a profile convexed outwardly in the tire radial direction.

The outside crown land region 6 and the inside crown land region 7 configured as such break the water film existing on the road surface, smoothly guide it toward the main grooves on both sides, and contact with the ground. Therefore, the wet performance can be improved.

In the present embodiment, the tread 14 of the inside crown land region 7 has a radius of curvature R2, and the tread 13 of the outside crown land region 6 has a radius of curvature R1 larger than the radius of curvature R2.

Thereby, the ground pressure of the outside crown land region 6 is equalized throughout the outside crown land region 6, the ground contacting property is improved, lateral deformation during cornering is suppressed, and therefore excellent steering stability can be obtained.

To improve the steering stability compared to the wet performance, a ratio R1/R2 of the radius of curvature R1 to the radius of curvature R2 is preferably not less than 1.02, more preferably not less than 1.03, and not greater than 1.05, more preferably not greater than 1.04.

If the ratio R1/R2 is smaller than 1.02, there may be a case where the above described effects are small. If the ratio R1/R2 is larger than 1.05, there is a possibility that the tread 13 of the outside crown land region 6 becomes too flat, and the wet performance is deteriorated.

It is preferred that the treads 13 and 14 of the land regions 6 and 7 each have a single radius of curvature. However, it is not limited to such configuration, each of the treads 13 and 14 of the land regions 6 and 7 may be composed of a plurality of arcs with different radii of curvature. In this case, the above-mentioned radius of curvature R1, R2 means that of a circular arc including the most outward point in the tire radial direction of the tread of the land region concerned.

It is preferable that each of the land regions 6 and 7 of the present embodiment has a profile such that the center in the tire axial direction of the land region protrudes radially outwards mostly. The land regions 6 and 7 configured as such can suppress uneven wear effectively.

In a case of a pneumatic tire for passenger cars as in the present embodiment, it is preferable that the radius of curvature R1 of the tread 13 of the outside crown land region 6 and the radius of curvature R2 of the tread 14 of the inside crown land region 7 are not less than 200 mm, more preferably not less than 220 mm, and not greater than 270 mm, more preferably not greater than 250 mm.

If the radii of curvature R1 and R2 are smaller than 200 mm, the rigidity of the land regions becomes small and therefore there is a possibility of degradation in the steering stability. If the radii of curvature R1 and R2 are larger than 270 mm, there is a possibility of degradation in the wet performance.

It is preferable that a maximum protruding amount P1 of the tread 13 of the outside crown land region 6 from a first virtual straight line 11 is equal to a maximum protruding amount P2 of the tread 14 of the inside crown land region 7 from a second virtual straight line 12, wherein the first virtual straight line 11 and second virtual straight line 12 are virtual straight lines extending between both axial edges 19 of the respective land regions. Therefore, it is possible to equalize wear progress of the outside crown land region 6 and the inside crown land region 7.

It is preferable that the maximum protruding amount P1 is not less than 0.4%, more preferably not less than 0.5%, and not greater than 0.8%, more preferably not greater than 0.7% of the axial width w4 of the tread of the outside crown land region 6. similarly, it is preferable that the mentioned maximum protruding amount P2 is from 0.4% to 0.8% of the axial width w5 of the tread of the inside crown land region 7.

According to this, noise performance is maintained and an excellent wet performance is exerted.

In the following, more detailed configurations of the outside crown land region 6 and the inside crown land region 7 will now be described.

In the present embodiment, as shown in FIG. 2, each of the outside crown land region 6 and the inside crown land region 7 has a plurality of sipes 15 each having a width smaller than 2 mm and has no grooves having a width larger than 2 mm.

The outside crown land region 6 and the inside crown land region 7 configured as such can be maintained in the rigidity, and suppress deformation of their ground contacting surfaces, therefore an excellent wear resistance can be obtained.

The inside crown land region 7 is provided with a plurality of inside central sipes 16. In the present embodiment, it is preferable that each of the inside central sipes 16 extends across the entire width of the inside crown land region 7, for example.

The inside central sipes 16 configured as such can further suppress the deformation of the ground contacting surface.

Further, it is preferable that each of the inside central sipes 16 in the present embodiment is configured to be arc-shaped, protruding toward one side in the tire circumferential direction (down side in FIG. 2).

The inside central sipes 16 configured as such increase the rigidity in the tire axial direction, of the inside crown land region 7 when the sipe's opposite walls contact with each other, therefore excellent steering stability can be obtained.

The outside crown land region 6 is provided with a plurality of outside center sipes 20. In the present embodiment, the outside center sipes 20 include a plurality of first sipe 21, second sipe 22 and third sipe 23 which have different shapes.

It is preferable that the first sipe 21 extends across the entire width of the outside crown land region 6. The first sipe configured as such suppresses the deformation of the ground contacting surface of the outside crown land region. Further, by the edges of the first sipe 21, the frictional force on a wet road can be increased.

It is preferable that the first sipe 21 is configured to be arc-shaped, protruding toward the opposite side of the inside center sipe 16 (up side in FIG. 2). According to this, impact sound occurring when the outside crown land region 6 and the inside crown land region 7 contact with the ground is changed into white noise, and therefore an excellent noise performance is obtained.

The second sipe 22 is configured, for example, such that one end is connected to the tire-equator-c-side edge of the outside crown land region 6 and the other end is terminated within the outside crown land region 6.

The third sipe 23 is configured, for example, such that one end is connected to the outside-tread-edge-Teo-side edge of the outside crown land region 6 and the other end is terminated within the outside crown land region 6.

The second sipe 22 and the third sipe 23 configured as such maintain the rigidity of the outside crown land region 6 and increase the edge components at the same time, and therefore can improve steering stability and the wet performance in a good balance.

In order to obtain the above-mentioned effects exerted further more, it is preferred that the axial length L4 of the second sipe 22 and the axial length L5 of the third sipe 23 are set in a range of from 0.50 to 0.70 times the axial width w4 of the tread of the outside crown land region 6.

In the present embodiment, the outside crown land region 6 includes, for example, a first portion 17 partitioned by the first sipes 21 and provided with the second sipe 22 and a second portion 18 partitioned by the first sipes 21 and provided with the second sipe 22. In the present embodiment, it is preferable that the first portion 17 and the second portion 18 are provided alternately in the tire circumferential direction. Such arrangement of the sipes effectively suppresses uneven wear of the outside crown land region 6.

It is preferable that the total length ΣL1 of the outside central sipes 20 provided in the outside crown land region 6 is greater than the total length ΣL2 of the inside central sipes 16 provided in the inside crown land region 7. specifically, it is preferable that the total length ΣL1 is set in a range of from 1.50 to 1.70 times the total length ΣL2. According to this, the rigidity difference between the outside crown land region 6 and the inside crown land region 7 is balanced, and excellent steering stability and excellent wear resistance can be obtained.

Figure 4:
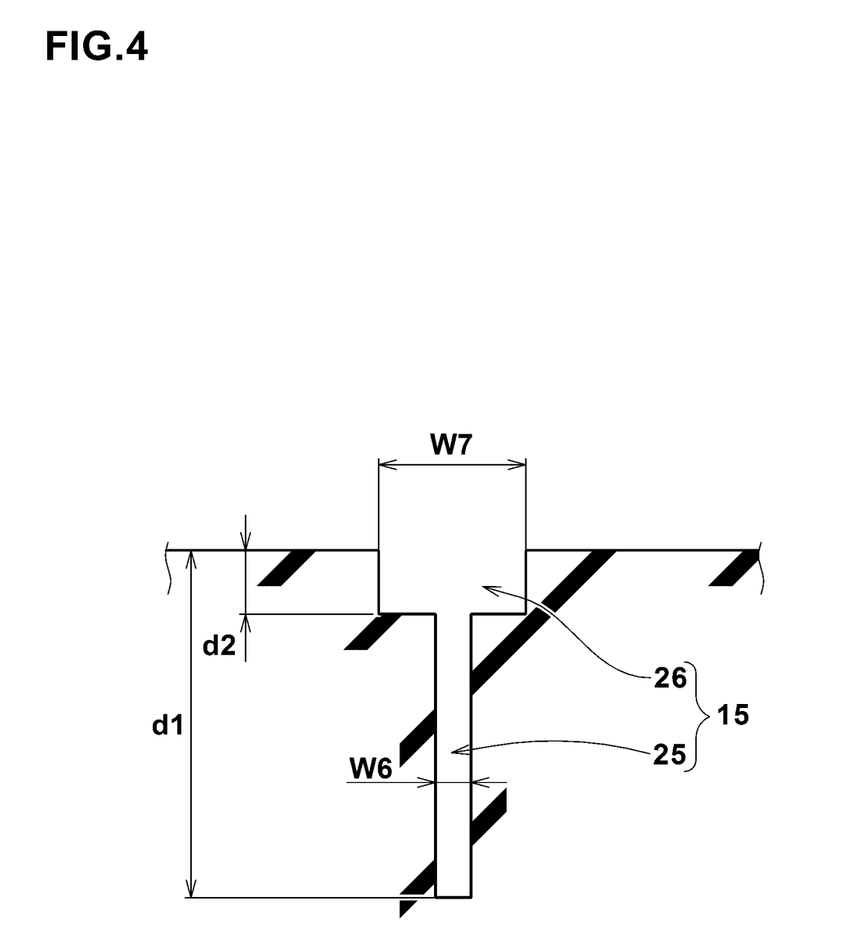
FIG. 4 is a cross-sectional view of an inside central sipe taken along line B-B in FIG. 2.

FIG. 4 shows a cross-section of the inside central sipe 16 taken along line B-B in FIG. 2 as an explanatory drawing of the configuration of each of the sipes 15.

As shown in FIG. 4, in the present embodiment, each of the sipes 15 has a sipe main portion 25 and a widened portion 26, for example.

It is preferable that the sipe main portion 25 has a width w6 smaller than 1 mm, for example. In the sipe main portion 25 configured as such, when ground pressure is exerted on the land region, the sipe walls easily contact with each other, and the apparent rigidity of the land region is increased.

In order to maintain the rigidity of the land regions and enhance the wet performance at the same time, it is preferred that a sipe depth d1 from the tread of the land region to the bottom of the sipe main portion 25 is not less than 0.30 times, more preferably not less than 0.4 times, and not more than 0.80 times, more preferably not more than 0.70 times the depth of the center main groove 5 (shown in FIG. 2).

The widened portion 26 is provided radially outside the sipe main portion 25, and has a larger width than the sipe main portion 25. The width w7 of the widened portion 26 is, for example, not smaller than 1.0 mm and smaller than 2.0 mm. The depth d2 of the widened portion 26 is, for example, from 0.5 to 2.0 mm.

In the present embodiment, the tread portion 2 includes an outside shoulder land region 8 located between the outside shoulder main groove 3 and the outside tread edge Teo, and an inside shoulder land region 9 located between the inside shoulder main groove 4 and the inside tread edge Tei, for example as shown in FIG. 1.

Figure 5:
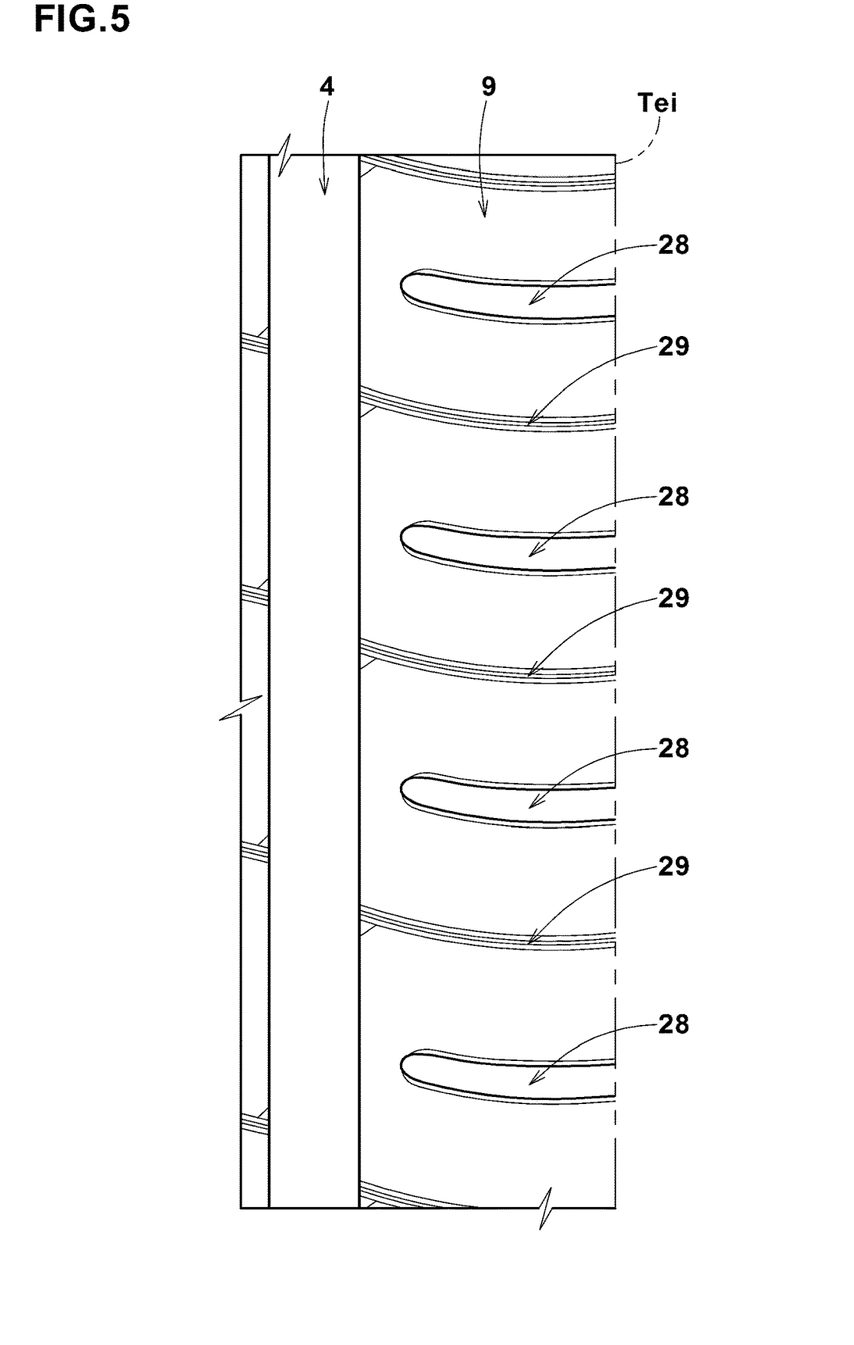
FIG. 5 is a magnified view of an inside shoulder land region shown in FIG. 1.

FIG. 5 shows a magnified view of the inside shoulder land region 9 shown in FIG. 1. It is preferable that the inside shoulder land region 9 is provided with a plurality of inside shoulder transverse grooves 28 and a plurality of inside shoulder sipes 29, for example as shown in FIG. 5.

It is preferable that the inside shoulder transverse groove 28 extends from the inside tread edge Tei toward the tire equator c and terminates within the inside shoulder land region 9, for example.

The inside shoulder transverse grooves 28 configured as such can lower the pumping sound occurring when the inside shoulder land region 9 contacts with the ground, and maintain the rigidity of the inside land region 9 to enhance the steering stability.

It is preferable that the angle θ1 (not shown) of the inside shoulder transverse groove 28 inclined with respect to the tire axial direction is gradually decreased toward the inside tread edge Tei. Further, the angle θ1 of the inside shoulder transverse groove 28 in the present embodiment is from 0 to 5 degrees at the inside tread edge Tei.

The inside shoulder transverse grooves 28 configured as such reduce the deformation of the inside shoulder land region 9 in the vicinity of the inside tread edge Tei and helps to improve steering response especially during sharp cornering.

It is preferable that the inside shoulder sipe 29 has a cross sectional shape similar to that of the sipe 15 (shown in FIG. 4). The inside shoulder sipe 29 extends from the inside tread edge Tei to the inside shoulder main groove 4, for example. The inside shoulder sipe 29 is arc-shaped, protruding toward one side in the tire circumferential direction (down side in FIG. 5). Further, it is preferable that the inside shoulder sipe 29 is arc-shaped, protruding toward the same direction as the inside central sipe 16 (shown in FIG. 2), for example in the present embodiment.

Figure 6:
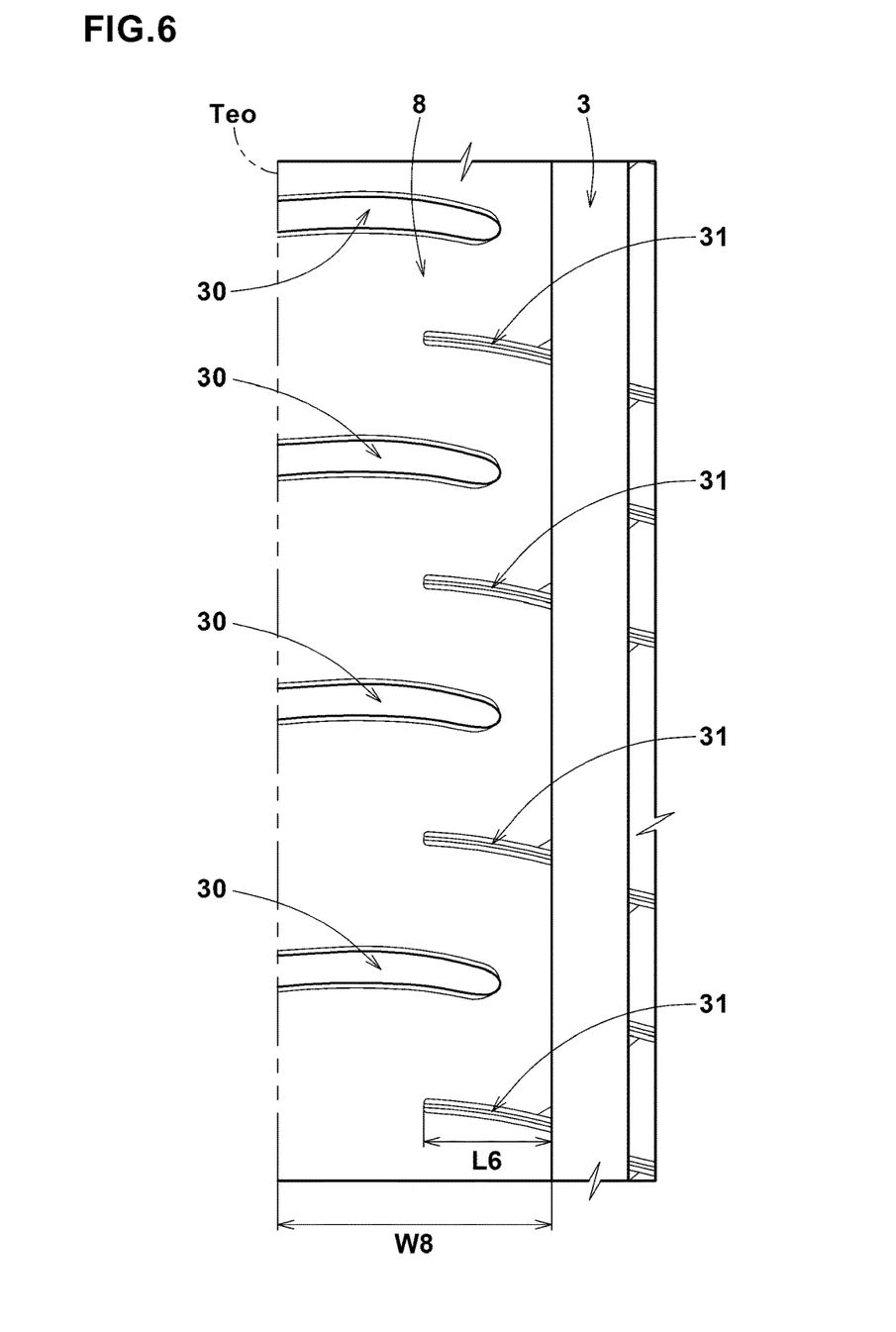
FIG. 6 is a magnified view of an outside shoulder land region shown in FIG. 1.

FIG. 6 shows a magnified view of the outside shoulder land region 8 shown in FIG. 1. It is preferable that the outside shoulder land region 8 is provided with a plurality of outside shoulder transverse grooves 30 and a plurality of outside shoulder sipes 31, for example as shown in FIG. 6.

It is preferable that the outside shoulder transverse groove 30 extends from the outside tread edge Teo toward the inside in the tire axial direction and terminates within the outside shoulder land region 8, for example.

The outside shoulder transverse grooves 30 configured as such can lower the pumping sound occurring when the outside shoulder land region 8 contacts with the ground, and maintain the rigidity of the outside shoulder land region 9 to thereby improve the steering stability.

It is preferred that the angle θ2 (not shown) of the outside shoulder transverse groove 30 with respect to the tire axial direction is gradually decreased toward the outside tread edge Teo.

Further, the angle θ2 of the outside shoulder transverse groove 30 in the present embodiment measured at the outside tread edge Teo is preferably in a range of from 0 to 5 degrees.

The outside shoulder transverse grooves 30 configured as such helps to exert an excellent steering stability.

It is preferable that, as shown in FIG. 1, intersecting portions 33 of the outside shoulder transverse grooves 30 with the inside tread edge Tei are respectively shifted in the tire circumferential direction from intersecting portions 32 of the inside shoulder transverse grooves 28 with the inside tread edge Tei. Thereby, the pumping sounds caused by the respective transverse grooves are changed into white noise, and therefore an excellent noise performance is obtained.

It is preferable that, as shown in FIG. 6, the outside shoulder sipe 31 has a cross sectional shape similar to that of the above-mentioned sipe 15 (shown in FIG. 4).

It is preferable that the outside shoulder sipe 31 extends from the outside shoulder main groove 3 toward the outside tread edge Teo and terminates within the outside shoulder land region 8, for example.

The outside shoulder sipes 31 configured as such increase the rigidity of the outside shoulder land region 8 in its outside-tread-edge-Teo side portion, therefore the steering stability during sharp cornering can be improved.

In order to improve the wet performance and the steering stability in a good balance, the axial length L6 of the outside shoulder sipe 31 is preferably not less than 0.35 times, more preferably not less than 0.40 times, and not more than 0.50 times, more preferably not more than 0.45 times the axial width w8 of the outside shoulder land region 8.

While detailed description has been made of the pneumatic tire as an embodiment of the present invention, the The results are indicated by a point in the evaluation based on the comparative example being 100, wherein the higher the point, the better the steering stability.

The test results are shown in Table 1.

TABLE 1

|  | Comparative example | working example 1 | working example 2 | working example 3 | working example 4 | working example 5 | working example 6 | working example 7 |
|---|---|---|---|---|---|---|---|---|
| Radius of curvature R1/Radius of curvature R2 | 1.00 | 1.04 | 1.02 | 1.03 | 1.05 | 1.04 | 1.04 | 1.04 |
| Maximum protruding amount P1/Width W4 of tread of Outside center land region (%) | 0.6 | 0.6 | 0.6 | 0.6 | 0.6 | 0.4 | 0.8 | 0.4 |
| Maximum protruding amount P2/Width W5 of tread of Inside center land region (%) | 0.6 | 0.6 | 0.6 | 0.6 | 0.6 | 0.4 | 0.8 | 0.8 |
| Wet performance (index) | 100 | 105 | 105 | 105 | 105 | 102 | 108 | 104 |
| Steering stability (evaluation point) | 100 | 110 | 102 | 105 | 102 | 102 | 100 | 101 | present invention can be embodied in various forms without being limited to the illustrated specific embodiment.

WORKING EXAMPLES

Based on the tread pattern shown in FIG. 1, pneumatic tires of size 195/65R15 were made by way of test according to the specifications listed in Table 1.

In the working examples, the radius of curvature R1 of the tread of the outside crown land region was larger than the radius of curvature R2 of the tread of the inside crown land region. As a comparative example, a pneumatic tire having the tread pattern shown in FIG. 1 in which the radius of curvature R1 was equal to the radius of curvature R2, was made by way of test.

Those test tires were tested for the wet performance and steering stability.

The common specifications and the test methods are as follows.
Rim: 15×6.03
Tire inner pressure: 230 kPa
Test car: displacement of 1500 cc, front-wheel drive
Tire mount position: all wheels
Radius of curvature R2 of the inside crown land region: 230.8 mm
Width w4 of the tread of the outside crown land region: 21.4 mm
Width w5 of the tread of the inner crown land region: 21.3 mm
<Wet Performance Test>

Using an inside drum test machine, each test tire was run on the drum surface with 5.0 mm depth water, and generation speed of aquaplaning phenomenon was measured under the following conditions.

The results are indicated by an index based on the comparative example being 100, wherein the larger the index value, the higher the generation speed, and the better the wet performance.
Slip angle: 1.0 degree
Vertical tire load: 4.2 kN
<Steering Stability Test>

Using the above-mentioned test car, the steering stability during traveling on a dry road surface of a test course was evaluated by the test driver.

From the test results, it was confirmed that the pneumatic tires as the working examples satisfy both of the wet performance and steering stability.

REFERENCE SIGNS LIST 2 tread portion
6 outside crown land region
7 inside crown land region
Teo outside tread edge
Tei inside tread edge
R1 radius of curvature of tread of outside crown land region
R2 radius of curvature of tread of inside crown land region

The invention claimed is:

1. A pneumatic tire whose position when mounted on a vehicle is specified, and which has a tread portion having an outside tread edge located toward the outside of the vehicle when mounted on the vehicle, an inside tread edge located toward the inside of the vehicle when mounted on the vehicle, an outside crown land region located between the tire equator and the outside tread edge, and an inside crown land region located between the tire equator and the inside tread edge,
wherein
in a meridian cross-section of the tire including the rotational axis of the tire in a regular state of the tire mounted on a regular rim, inflated to a regular pressure and loaded with no tire load,
each of the outside crown land region and the inside crown land region has a tread convexed outwardly in the tire radial direction, and
a radius of curvature of the tread of the outside crown land region is greater than a radius of curvature of the tread of the inside crown land region,
wherein
the tread portion is provided with an outside shoulder main groove, an inside shoulder main groove and a center main groove therebetween, each of said grooves extend continuously in the tire circumferential direction, and
the outside shoulder main groove, the inside shoulder main groove and the center main groove each have a width of from 6.5% to 9.5% of a tread width between the outside tread edge and the inside tread edge.

2. The pneumatic tire according to claim 1, wherein the outside crown land region is defined between the outside shoulder main groove and the center main groove, and
the inside crown land region is defined between the inside shoulder main groove and the center main groove.

3. The pneumatic tire according to claim 2, wherein the radius of curvature of the tread of the outside crown land region and the radius of curvature of the tread of the inside crown land region are not less than 200 mm and not greater than 270 mm.

4. The pneumatic tire according to claim 2, wherein
a maximum protruding amount P1 of the tread of the outside crown land region from a first virtual straight line extending between both axial edges of the outside crown land region is not less than 0.4% and not greater than 0.8% of the axial width of the tread of the outside crown land region, and
a maximum protruding amount P2 of the tread of the inside crown land region from a second virtual straight line extending between both axial edges of the inside crown land region is not less than 0.4% and not greater than 0.8% of the axial width of the tread of the inside crown land region.

5. The pneumatic tire according to claim 2, wherein
each of the outside crown land region and the inside crown land region is provided with a plurality of sipes having a depth of not less than 0.30 times and not more than 0.80 times the depth of a center main groove located between the outside crown land region and the inside crown land region and extending continuously in the tire circumferential direction.

6. A pneumatic tire whose position when mounted on a vehicle is specified, and which has a tread portion having an outside tread edge located toward the outside of the vehicle when mounted on the vehicle, an inside tread edge located toward the inside of the vehicle when mounted on the vehicle, an outside crown land region located between the tire equator and the outside tread edge, and an inside crown land region located between the tire equator and the inside tread edge,
wherein
in a meridian cross-section of the tire including the rotational axis of the tire in a regular state of the tire mounted on a regular rim, inflated to a regular pressure and loaded with no tire load,
each of the outside crown land region and the inside crown land region has a tread convexed outwardly in the tire radial direction, and
a radius of curvature of the tread of the outside crown land region is greater than a radius of curvature of the tread of the inside crown land region,
wherein
in the meridian cross-section, a maximum protruding amount of the tread of the outside crown land region from a first virtual straight line extending between both axial edges of the outside crown land region is equal to a maximum protruding amount of the tread of the inside crown land region from a second virtual straight line extending between both axial edges of the inside crown land region.

7. The pneumatic tire according to claim 6, wherein
each of the outside crown land region and the inside crown land region has a plurality of sipes with a width smaller than 2 mm and has no grooves with a width larger than 2 mm.

8. The pneumatic tire according to claim 7, wherein
the sipes include a plurality of outside central sipes located in the outside crown land region, and a plurality of inside central sipes located in the inside crown land region, and
the total length of the outside central sipes is greater than the total length of the inside central sipes.

9. The pneumatic tire according to claim 8, wherein
each of the inside central sipes extends across the entire width of the inside crown land region,
the outside central sipes include
a plurality of first sipes extending across the entire width of the outside crown land region,
a second sipe whose one end is connected to an edge on the tire equator side, of the outside crown land region, and the other end is terminated within the outside crown land region,
a third sipe whose one end is connected to an edge on the outside tread edge side, of the outside crown land region, and the other end is terminated within the outside crown land region,
the outside crown land region includes
a first portion partitioned by the first sipes and provided with the second sipe, and
a second portion partitioned by the first sipes and provided with the third sipe, and
the first portion and the second portion are provided alternately in the tire circumferential direction.

10. A pneumatic tire whose position when mounted on a vehicle is specified, and which has a tread portion having an outside tread edge located toward the outside of the vehicle when mounted on the vehicle, an inside tread edge located toward the inside of the vehicle when mounted on the vehicle, an outside crown land region located between the tire equator and the outside tread edge, and an inside crown land region located between the tire equator and the inside tread edge,
wherein
in a meridian cross-section of the tire including the rotational axis of the tire in a regular state of the tire mounted on a regular rim, inflated to a regular pressure and loaded with no tire load,
each of the outside crown land region and the inside crown land region has a tread convexed outwardly in the tire radial direction, and
a radius of curvature of the tread of the outside crown land region is greater than a radius of curvature of the tread of the inside crown land region,
wherein
each of the outside crown land region and the inside crown land region has a plurality of sipes with a width smaller than 2 mm and has no grooves with a width larger than 2 mm,
wherein
the sipes include a plurality of outside central sipes located in the outside crown land region, and a plurality of inside central sipes located in the inside crown land region, and
the total length of the outside central sipes is greater than the total length of the inside central sipes.

11. The pneumatic tire according to claim 10, wherein
each of the inside central sipes extends across the entire width of the inside crown land region, the outside central sipes include
a plurality of first sipes extending across the entire width of the outside crown land region,
a second sipe whose one end is connected to an edge on the tire equator side, of the outside crown land region, and the other end is terminated within the outside crown land region,
a third sipe whose one end is connected to an edge on the outside tread edge side, of the outside crown land region, and the other end is terminated within the outside crown land region,
the outside crown land region includes
a first portion partitioned by the first sipes and provided with the second sipe, and
a second portion partitioned by the first sipes and provided with the third sipe, and
the first portion and the second portion are provided alternately in the tire circumferential direction.

12. A pneumatic tire whose position when mounted on a vehicle is specified, and which has a tread portion having an outside tread edge located toward the outside of the vehicle when mounted on the vehicle, an inside tread edge located toward the inside of the vehicle when mounted on the vehicle, an outside crown land region located between the tire equator and the outside tread edge, and an inside crown land region located between the tire equator and the inside tread edge,
wherein
in a meridian cross-section of the tire including the rotational axis of the tire in a regular state of the tire mounted on a regular rim, inflated to a regular pressure and loaded with no tire load,
each of the outside crown land region and the inside crown land region has a tread convexed outwardly in the tire radial direction, and
a radius of curvature of the tread of the outside crown land region is greater than a radius of curvature of the tread of the inside crown land region,
wherein
the radius of curvature of the tread of the outside crown land region and the radius of curvature of the tread of the inside crown land region are not less than 200 mm and not greater than 270 mm.

13. A pneumatic tire whose position when mounted on a vehicle is specified, and which has a tread portion having an outside tread edge located toward the outside of the vehicle when mounted on the vehicle, an inside tread edge located toward the inside of the vehicle when mounted on the vehicle, an outside crown land region located between the tire equator and the outside tread edge, and an inside crown land region located between the tire equator and the inside tread edge,
wherein
in a meridian cross-section of the tire including the rotational axis of the tire in a regular state of the tire mounted on a regular rim, inflated to a regular pressure and loaded with no tire load,
each of the outside crown land region and the inside crown land region has a tread convexed outwardly in the tire radial direction, and
a radius of curvature of the tread of the outside crown land region is greater than a radius of curvature of the tread of the inside crown land region,
wherein
a maximum protruding amount P1 of the tread of the outside crown land region from a first virtual straight line extending between both axial edges of the outside crown land region is not less than 0.4% and not greater than 0.8% of the axial width of the tread of the outside crown land region, and
a maximum protruding amount P2 of the tread of the inside crown land region from a second virtual straight line extending between both axial edges of the inside crown land region is not less than 0.4% and not greater than 0.8% of the axial width of the tread of the inside crown land region.

14. A pneumatic tire whose position when mounted on a vehicle is specified, and which has a tread portion having an outside tread edge located toward the outside of the vehicle when mounted on the vehicle, an inside tread edge located toward the inside of the vehicle when mounted on the vehicle, an outside crown land region located between the tire equator and the outside tread edge, and an inside crown land region located between the tire equator and the inside tread edge,
wherein
in a meridian cross-section of the tire including the rotational axis of the tire in a regular state of the tire mounted on a regular rim, inflated to a regular pressure and loaded with no tire load,
each of the outside crown land region and the inside crown land region has a tread convexed outwardly in the tire radial direction, and
a radius of curvature of the tread of the outside crown land region is greater than a radius of curvature of the tread of the inside crown land region,
wherein
each of the outside crown land region and the inside crown land region is provided with a plurality of sipes having a depth of not less than 0.30 times and not more than 0.80 times the depth of a center main groove located between the outside crown land region and the inside crown land region and extending continuously in the tire circumferential direction.

* * * * *